US008583559B2

(12) United States Patent
Nakashima (10) Patent No.: US 8,583,559 B2
(45) Date of Patent: Nov. 12, 2013

(54) INFORMATION PROCESSING APPARATUS, METHOD OF CONTROLLING THEREOF, AND COMPUTER-READABLE STORAGE MEDIUM STORING PROGRAM THEREFOR

(75) Inventor: Kousuke Nakashima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 263 days.

(21) Appl. No.: 12/815,856

(22) Filed: Jun. 15, 2010

(65) Prior Publication Data

US 2011/0004874 A1 Jan. 6, 2011

(30) Foreign Application Priority Data

Jul. 6, 2009 (JP) ................................. 2009-160260

(51) Int. Cl.
*G06F 21/00* (2013.01)

(52) U.S. Cl.
USPC .................. 705/59; 705/51; 705/56; 705/57; 705/58; 705/904; 726/30; 726/31; 726/32

(58) Field of Classification Search
USPC ..................... 705/56–59, 904, 51; 726/30–32
See application file for complete search history.

(56) References Cited

U.S. PATENT DOCUMENTS

| 7,693,990 | B2* | 4/2010 | Tsujimoto ..................... 709/225 |
| 2004/0230842 | A1* | 11/2004 | Osada ............................ 713/202 |
| 2005/0246771 | A1* | 11/2005 | Hunt et al. ..................... 726/18 |
| 2006/0048108 | A1* | 3/2006 | Ushiku .......................... 717/136 |
| 2006/0161898 | A1* | 7/2006 | Bauman et al. ................ 717/127 |
| 2007/0124510 | A1* | 5/2007 | Ando ............................... 710/8 |
| 2007/0130208 | A1* | 6/2007 | Bornhoevd et al. ......... 707/104.1 |
| 2007/0220093 | A1* | 9/2007 | Bracke et al. .................. 709/204 |
| 2007/0234349 | A1* | 10/2007 | Ushiku .......................... 717/174 |
| 2007/0253010 | A1* | 11/2007 | Selvaraj ....................... 358/1.13 |
| 2007/0288989 | A1* | 12/2007 | Aarnos et al. ...................... 726/1 |
| 2008/0148353 | A1* | 6/2008 | Dohi ................................ 726/2 |
| 2008/0170696 | A1* | 7/2008 | Yoshimura et al. ........... 380/277 |
| 2008/0243862 | A1* | 10/2008 | Pathak et al. ................... 707/10 |
| 2008/0244057 | A1* | 10/2008 | Kojima .......................... 709/223 |
| 2008/0301771 | A1* | 12/2008 | Kawai et al. ...................... 726/2 |
| 2009/0020600 | A1* | 1/2009 | Akiba ........................... 235/375 |
| 2010/0293103 | A1* | 11/2010 | Nikitin et al. ................... 705/80 |
| 2011/0066721 | A1* | 3/2011 | Shinomiya .................... 709/224 |

FOREIGN PATENT DOCUMENTS

JP 2004-234591 A 8/2004

OTHER PUBLICATIONS

Sunil Patil, "Hello, OSGi, Part 1: Bundles for beginners", JavaWorld, all pages, Mar. 4, 2008.*
Japanese Office Action dated Jul. 19, 2013, issued in counterpart Japanese Application No. 2009-160260.

* cited by examiner

*Primary Examiner* — Calvin Cheung
(74) *Attorney, Agent, or Firm* — Fitzpatrick, Cella, Harper & Scinto (57) ABSTRACT

An application program or an extended application program is installed that extends the functionality of this application program. If the application program is installed, a license file used in this application program is stored in a storage unit. If the extended application is installed, then control is executed so as to install the extended application using the license file stored in the storage unit and used in installing the application program corresponding to the extended application program.

19 Claims, 5 Drawing Sheets

```
Application-Id: 1111-2222-3333-4444
Bundle-Activator: ApplicationActivator
Bundle-Name: HostBundle
Bundle-SymbolicName: 1111-2222-3333-4444
...
...
```

FIG. 4B

```
Application-Id: 1111-2222-3333-5555
Bundle-Name: FramentBundle
Fragment-Host: 1111-2222-3333-4444
...
...
```

FIG. 4C

```
LicenseFile-Version: 1
LicenseFile-Id: aaaa-bbbb-cccc-dddd
Application-Id: 1111-2222-3333-4444
Serial-No: *

| APPLICATION ID | LICENSE FILE ID |
|---|---|
| 1111-1111-1111-1111 | aaaa-aaaa-aaaa-aaaa |
| 2222-2222-2222-2222 | bbbb-bbbb-bbbb-bbbb |
| 3333-3333-3333-3333 | cccc-cccc-cccc-cccc |
| | |
| | |
| | |

FIG. 6

INFORMATION PROCESSING APPARATUS, METHOD OF CONTROLLING THEREOF, AND COMPUTER-READABLE STORAGE MEDIUM STORING PROGRAM THEREFOR

BACKGROUND OF THE INVENTION

1. Field of the Invention

The present invention relates to an information processing apparatus for installing applications, a method of controlling the information processing apparatus, and a computer-readable storage medium storing a program for implementing such control.

2. Description of the Related Art

An information processing apparatus in which all application programs (also referred to simply as applications) have been embedded in firmware in advance is now equipped with a platform that enables applications to be installed dynamically. In such an information processing apparatus, it is possible for a device to be customized to the optimum configuration in conformity with usage by the user. Available as an application platform is the OSGi Service Platform (referred to as "OSGi" below), which is an embedded-device-oriented Java (registered trademark) application platform. OSGi defines bundles as units of software module management and defines the specifications for managing a life cycle comprising install, start, stop, update and uninstall. Such an application platform is capable of supplying an application with embedded functions such as copying, scanning and printing.

It is well known that when one application utilizes a management function or embedded function of an application platform as is without verification, this will have unpredictable effects upon other applications and the device proper. In general, therefore, operation verification is carried out for the purpose of assuring operation of all applications. Further, applications whose operation has been verified are encrypted by respective application-specific encryption keys, and the application platform is adapted in such a manner that only an encrypted application can be installed. As a result, when an application is installed, a license file containing decryption-key information is required to be installed together with the application file.

Accordingly, the application proper is made a host bundle that has been defined by the OSGI specifications. Further, a revised or extended portion of an application [an extended application program (also referred to simply as an "extended application")] is made a fragment bundle that has been defined by the OSGi specifications. A "fragment bundle" is a bundle that does not perform any action by itself; the fragment bundle per se is attached to the class-loader space of the host bundle. If, when an application is revised or extended in such case, it is so arranged that the application is revised or extended using a fragment bundle, this is efficient because the size of the file installed is reduced.

However, in a case where an extended application is installed anew, the corresponding license file must be installed anew. Furthermore, in a case where a license file is downloaded upon being issued by a license issuing server, installation requires additional labor and operating efficiency declines as a consequence.

SUMMARY OF THE INVENTION

An aspect of the present invention is to solve this problem with the conventional technology.

The present invention provides an information processing apparatus for installing an extended application program using a license file relating to an application program that corresponds to this extended application program, a method of controlling the information processing apparatus, and a computer-readable storage medium storing a program for implementing this method.

The present invention in its first aspect provides an information processing apparatus comprising:

an installing unit configured to install an application program or an extended application program that extends the functionality of the application program;

a storage control unit configured to, in a case where the application program is installed by the installing unit, store a license file, which is used in installing the application program, in a storage unit; and a control unit configured to, in a case where the extended application program is installed by the installing unit, control so as to install the extended application program using the license file stored in the storage unit and used in installing the application program corresponding to the extended application program.

The present invention in its second aspect provides a method of controlling an information processing apparatus comprising:

an installing step of installing an application program or an extended application program that extends the functionality of this application program;

in a case where the application program is installed at the installing step,
a storage control step of storing a license file, which is used in installing the application program, in a storage unit; and in a case where the extended application program is installed at the installing step,
a control step of controlling so as to install the extended application program using the license file stored in the storage unit and used in installing the application program corresponding to the extended application program.

The present invention in its third aspect provides a computer-readable storage medium storing a program for causing a computer to function so as to:

install an application program or an extended application program that extends the functionality of this application program;

in a case where the application program is installed, store a license file, which is used in installing the application program, in a storage unit; and in a case where the extended application program is installed, control so as to install the extended application program using the license file stored in the storage unit and used in installing the application program corresponding to the extended application program.

In accordance with the present invention, extended application software can be installed using a license file relating to application software corresponding to this extended application software.

Further features of the present invention will become apparent from the following description of exemplary embodiments with reference to the attached drawings.

DESCRIPTION OF THE EMBODIMENTS

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

It should be noted that identical structural elements in the drawings are designated by like reference characters and repetitious description thereof is omitted.

Figure 1:
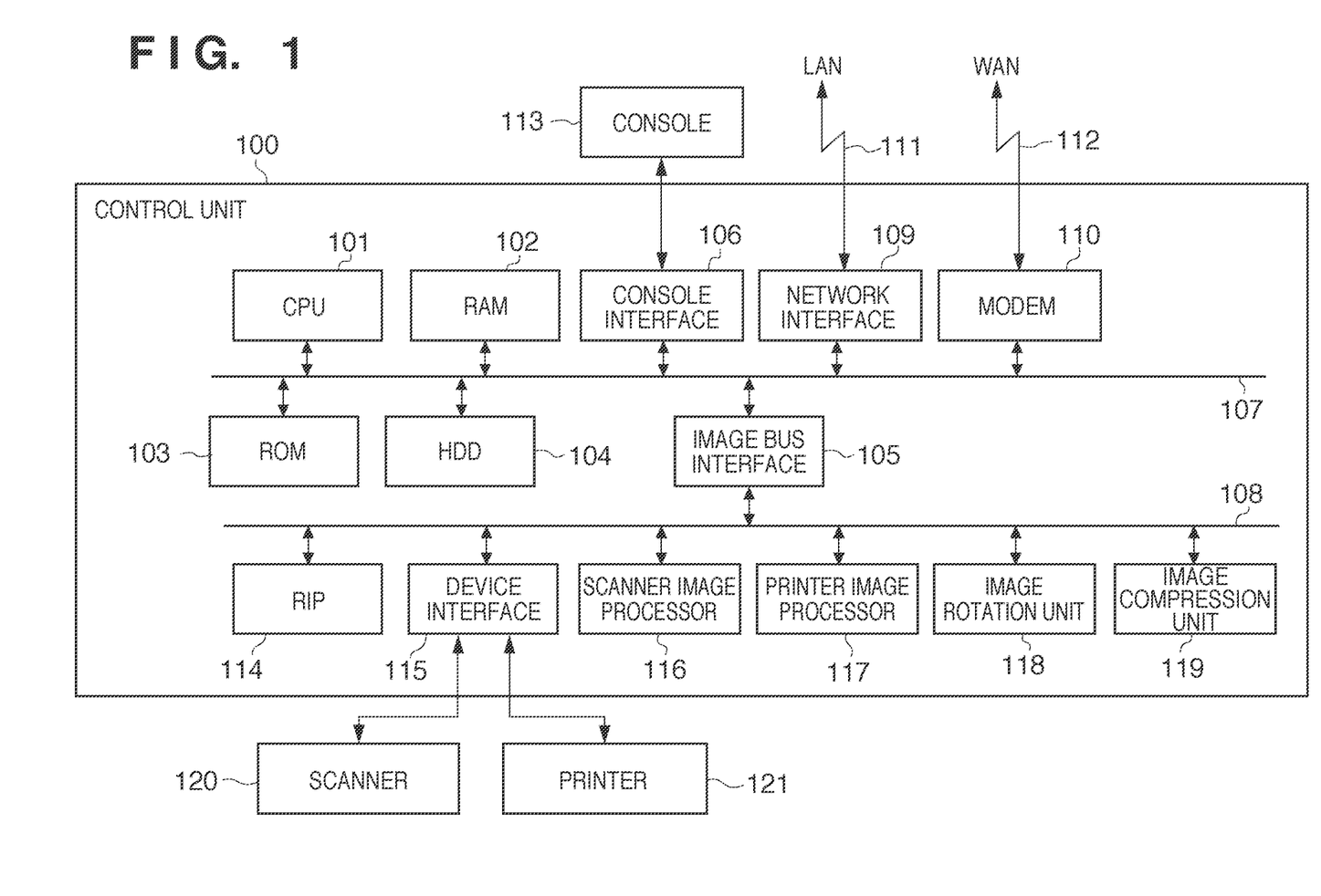
FIG. 1 is a block diagram illustrating the internal configuration of an information processing apparatus.

FIG. 1 is a block diagram illustrating the internal configuration of an information processing apparatus assumed to be a multifunction peripheral in this example. As shown in FIG. 1, a control unit 100 is connected to a scanner 120 and printer 121 serving as image input devices. The control unit 100 implements a copy function by using the printer 121 to print out image data that has been read by the scanner 120, by way of example. The control unit 100 is connected to a LAN 111 or public line (WAN) 112 and inputs/outputs image information and device information.

The control unit 100 includes a CPU 101 for launching an operating system using a boot program that has been stored in a ROM 103. Using the operating system, the CPU 101 executes various processing by executing application programs that have been stored on a hard-disk drive (HDD) 104. Further, the CPU 101 executes storage control for controlling storage and readout of data to and from a RAM 102 and the hard-disk drive 104. Application programs are composed of software modules and, in addition to a program for implementing a copy function, are programs for implementing a transmit/FAX function, box function an Web browser function. Further, there is a program for implementing a network function to send and receive data to and from the outside, and a Java (registered trademark) application platform function also is included. The Java (registered trademark) application platform function manages a Java (registered trademark) application in line with use of OSGi and provides the application with embedded functions, starting with a copy function, as a library and system service.

The RAM 102 is used as the work area of the CPU 101. The RAM 102 provides an image memory area, which is for storing image data temporarily, along with the work area. The hard-disk drive 104 stores image data together with application programs. A console interface (I/F) 106, a network interface 109, a modem 110 and an image bus interface 105 are connected together with the RAM 102 and ROM 103 to the CPU 101 via a system bus 107. The console interface 106 interfaces a console 113 having a touch-sensitive panel and outputs image data, which is displayed on the console 113, to the console 113. Further, the console interface 106 sends the CPU 101 information that the user has input using the console 113.

The network interface 109 is connected to the LAN 111 and inputs/outputs information to and from devices on the LAN 111. The modem 110 is connected to the public line 112 and inputs/outputs information via the public line 112. The image bus interface 105 is a bus bridge for connecting the system bus 107 and an image bus 108, which transfers image data at high speed, and for converting the data structure. A PCI bus or IEEE 1394, etc., is used as the image bus 108. Connected to the image bus 108 are a raster image processor (RIP) 114, a device interface 115, a scanner image processor 116, a printer image processor 117, an image rotation unit 118 and an image compression unit 119. The RIP 114 is a processor for expanding a PDL code into a bitmap image.

The scanner 120 and printer 121 are connected to the device interface 115, which subjects the image data to a synchronous/asynchronous conversion. The scanner image processor 116 subjects input image data to correction, manipulation and editing. The printer image processor 117 subjects printout image data to a printer correction and resolution conversion, etc. The image rotation unit 118 rotates image data. The image compression unit 119 compresses multi-level image data to JPEG data, compresses bi-level image data to JBIG, MMR or MH data, etc., and expands (decompresses) image data.

Figure 2:
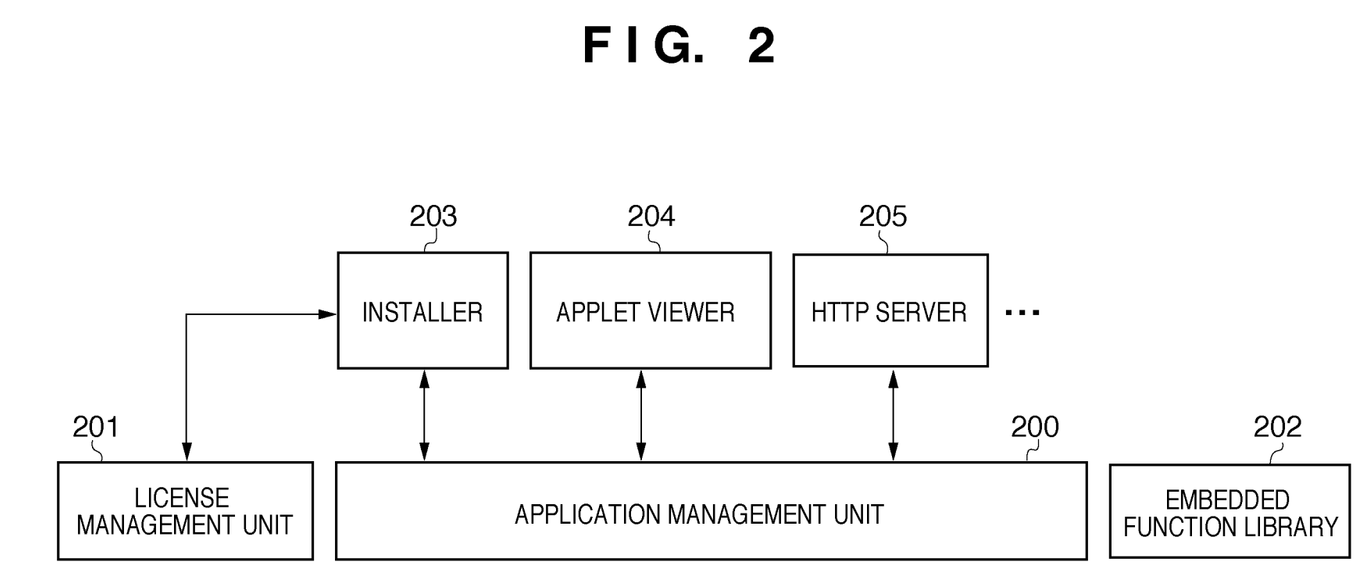
FIG. 2 is a diagram illustrating the software configuration of application platform functions.

FIG. 2 is a diagram illustrating the software configuration of Java (registered trademark) application platform functions implemented in the information processing apparatus shown in FIG. 1. Each item of software other than an embedded function library 202 is implemented by having the CPU 101 of the information processing apparatus execute a program that has been stored in the RAM 102 or hard-disk drive 104. The embedded function library 202 has been stored in the RAM 102 or hard-disk drive 104 and is not implemented by program execution using the CPU 101. The Java (registered trademark) application platform functions include an application management unit 200, a license management unit 201, the embedded function library 202, an installer 203, an applet viewer 204 and an HTTP server 205. The application management unit 200 has been implemented in line with the OSGi specifications and performs life-cycle management, namely Java (registered trademark) application (also referred to as a bundle) install, start, stop and uninstall. In accordance with a command from the installer 203, the application management unit 200 stores the application file, which constitutes the bundle, on the hard-disk drive 104.

The license management unit 201 performs management of the license corresponding to the application file. In accordance with a command from the installer 203, the license management unit 201 stores the license file, which includes decryption key information of the application file, on the hard-disk drive 104. The embedded function library 202 provides a Java (registered trademark) library for controlling embedded functions, such as the copy function, scan function, print function and transmit/FAX function, from the Java (registered trademark) application. The installer 203, applet viewer 204 and HTTP server 205 are Java (registered trademark) applications controlled by the application management unit 200.

The installer 203 installs the Java (registered trademark) application. The installer 203 instructs the license management unit 201 and application management unit 200 to store the application file and license file, respectively. Further the installer 203 reads out the application file, which is described in an application list (described later) stored in the hard-disk drive 104, and stores the application file in the RAM 102. Further, the installer 203 writes the name of the application file, which has been stored in the RAM 102, into the application list stored in the hard-disk drive 104. The applet viewer 204 displays an application file, which has been implemented as a Java (registered trademark) applet, on the console 113 via the console interface 106, and executes control based upon an input from the console 113. Using HTTP, the HTTP server 205 makes available an HTML page generated by an application file implemented as a Java (registered trademark) servlet.

Figure 3:
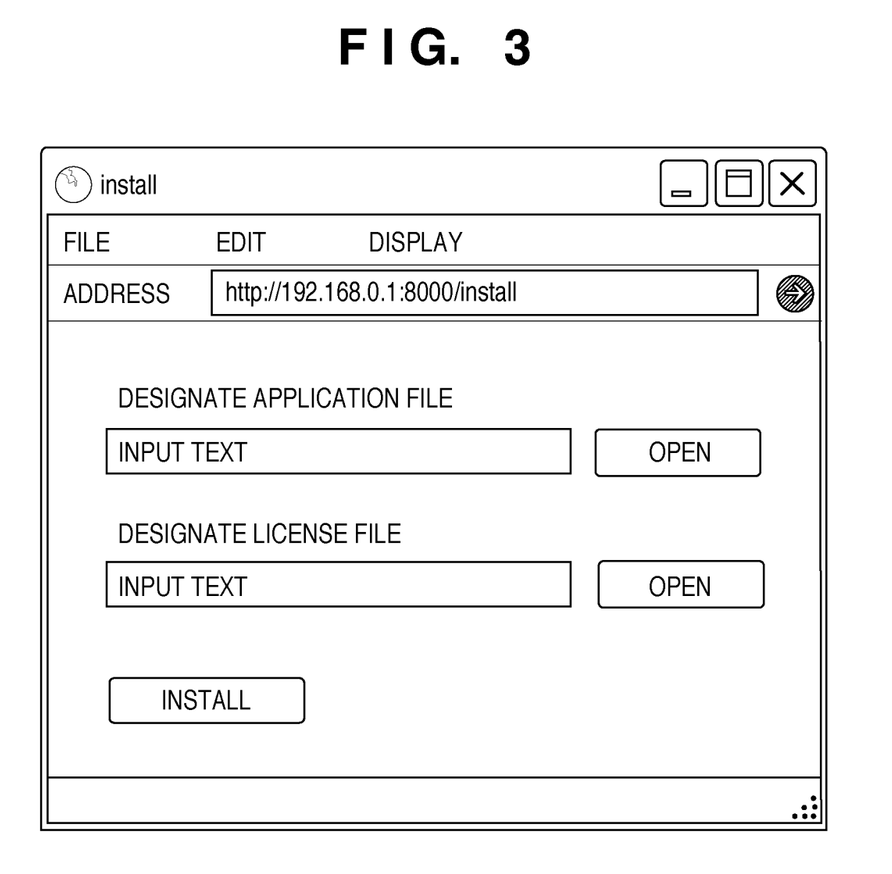
FIG. 3 is a diagram illustrating an example of a user interface screen of an installer.

FIG. 3 is a diagram illustrating an example of a user interface screen of the installer 203 implemented as a Java (registered trademark) servlet and displayed on the Web browser. The user interface screen shown in FIG. 3 includes a text form (application acceptance) for accepting input of an application file path and a text form (license file acceptance) for accepting input of a license file path. The user interface screen further includes an install button for specifying installation of the application file. The user inputs the application file and the license file and clicks the install button on the user interface screen to thereby specify installation of the application file. If installation of the application file has thus been specified, the CPU 101 starts processing for installing this application file.

In this embodiment, an application file has been archived in the JAR [Java (registered trademark) ARchive] format. Such an application file includes a manifest file, a class file and a resource file. The class file and the resource file have been encrypted using encryption key information that is unique for every application.

Figure 4A:
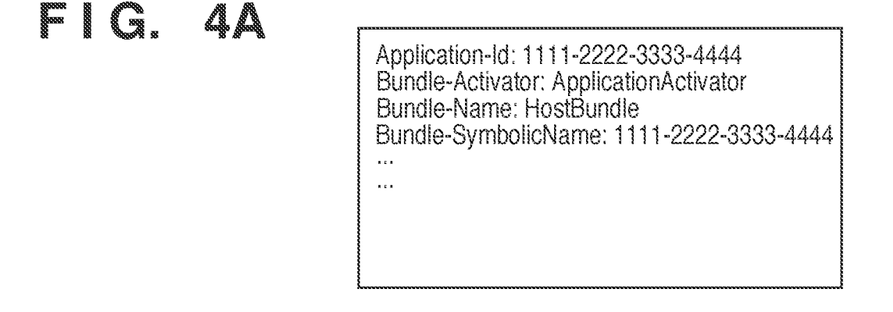
FIGS. 4A to 4C are diagrams illustrating examples of files used in this embodiment.

FIG. 4A is a diagram illustrating an example of a manifest file in a bundle. The file shown in FIG. 4A is one example of the main body of an application (application program) in this embodiment. An application ID for uniquely identifying the application has been defined in the manifest file. The class name of a bundle activator class that implements operation when the bundle is started and stopped has been defined as the Bundle-Activator header. In the case of a host bundle, a bundle symbolic name, which is information that uniquely identifies the bundle, has been defined as the Bundle-SymbolicName header. In this embodiment the bundle symbolic name and application ID are assumed to be identical.

Figure 4B:
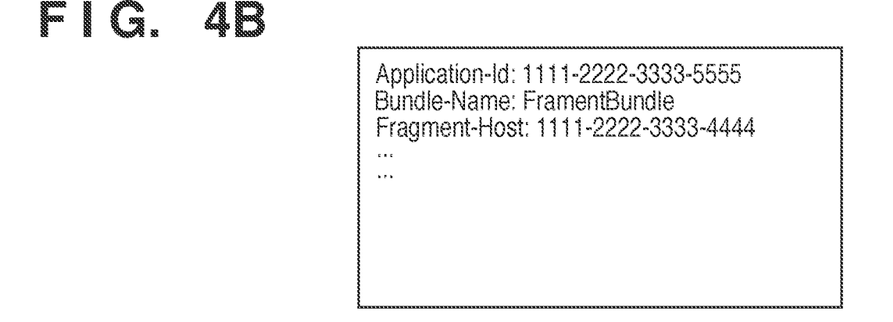

FIG. 4B is a diagram illustrating an example of a manifest file in a fragment bundle (extended application program). The file shown in FIG. 4B is one example of an extended application for extending the functionality of the main application in this embodiment. In the case of a fragment bundle, the bundle symbolic name of the host bundle has been defined as the Fragment-Host header. In this embodiment, the bundle symbolic name and the application ID are identical. The fragment bundle is attached to the host bundle linked by the application ID defined in the Fragment-Host header.

Figure 4C:
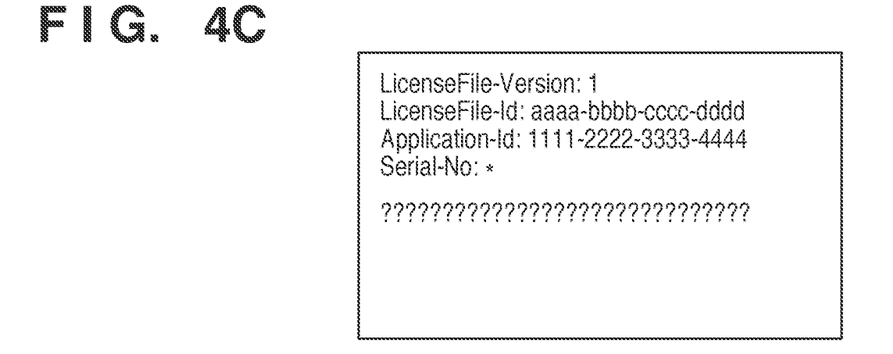

FIG. 4C is a diagram illustrating an example of a license file for allowing installation. The license file includes a license file ID, an application ID and decryption key information. The license file ID is an ID for uniquely identifying the license. The application ID indicates that the application file to which the license file corresponds. The decryption key information is key information for decrypting the encrypted portion of the corresponding application file.

Figure 5:
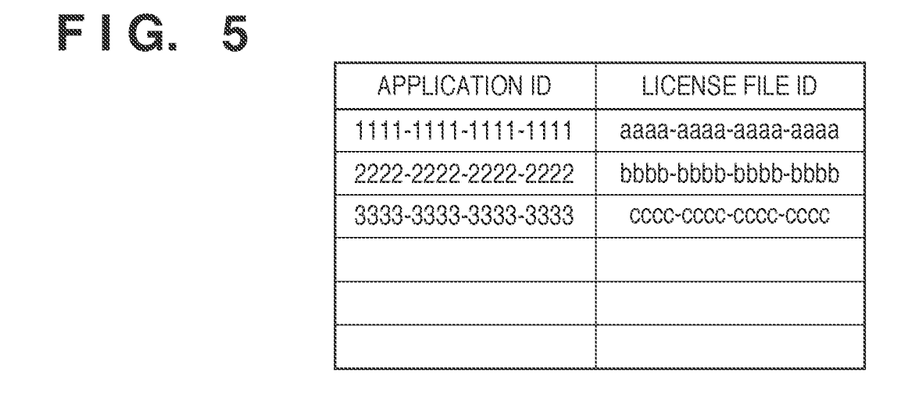
FIG. 5 is a diagram illustrating an example of an application list.

FIG. 5 is a diagram illustrating an example of an application list. The application list is created in the form of a table that includes application IDs (application identification information) and license file IDs (license file identification information). The table is stored in the hard-disk drive 104 or RAM 102. As illustrated in FIG. 5, the application IDs and license file IDs correspond. The application IDs and license file IDs described in the application list are updated by the installer 203.

In this embodiment, license files and application files have been stored in the form of a directory in the hard-disk drive 104. The storage destination of a license file is designated, inclusive of license file ID and license file name in hierarchical fashion, in a subdirectory under the partition name. The storage destination of an application file is designated, inclusive of application ID and application file name in hierarchical fashion, in the subdirectory under the partition name. Accordingly, in a case where application IDs included in a manifest file are the same, the storage destinations of the application files also are the same. In this case, an already stored application file is deleted and the new application file is stored (re-installed).

Figure 6:
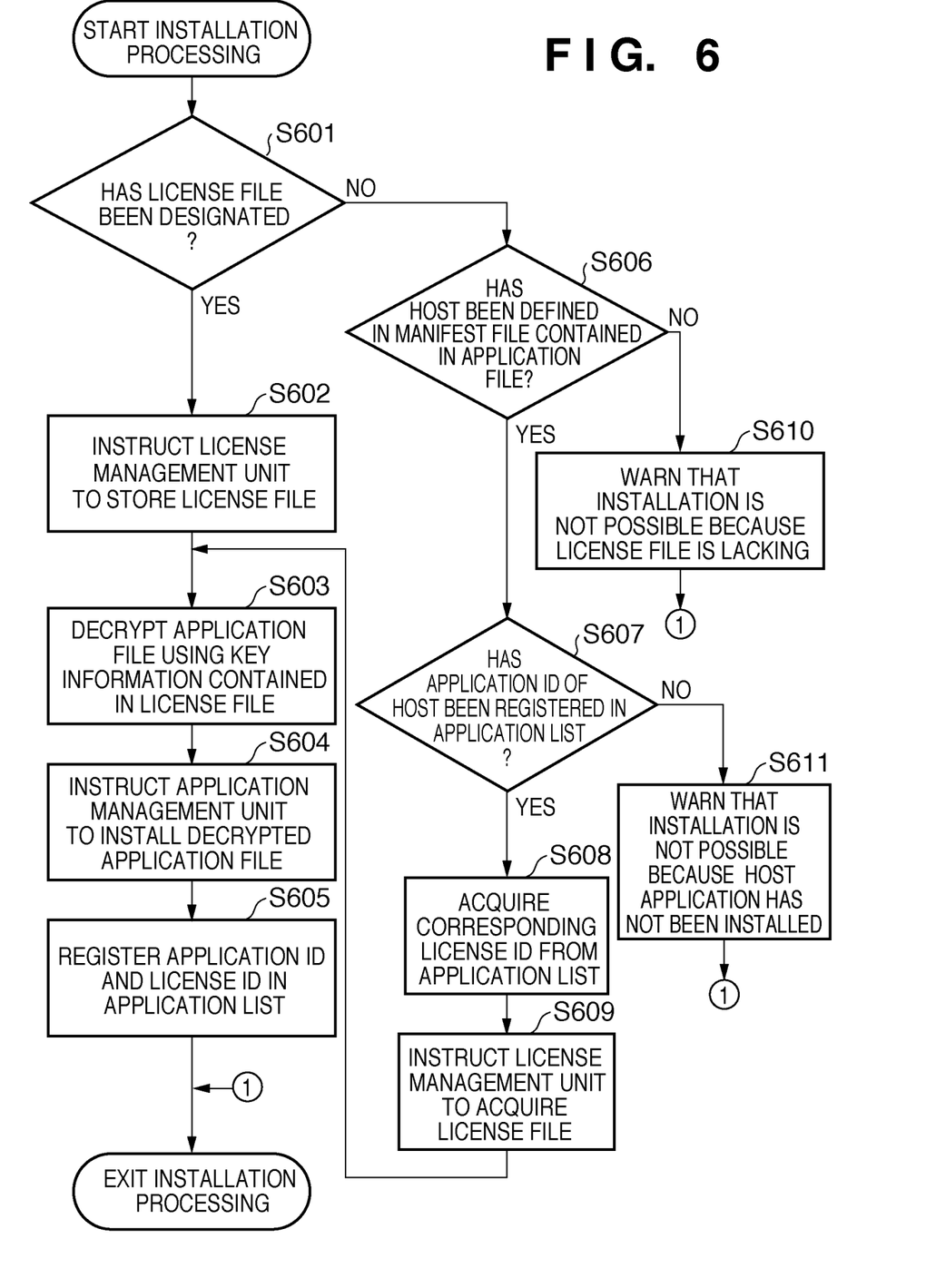
FIG. 6 is a flowchart illustrating installation processing.

FIG. 6 is a flowchart illustrating installation processing executed by the installer 203. The operation indicated in the flowchart of FIG. 6 is carried out by having the CPU 101 of FIG. 1 execute the program that has been stored in the ROM 103. If the install button on the user interface screen (FIG. 3) of the installer 203 displayed on the Web browser is clicked and the command to install an application is accepted, the installer 203 starts processing for installing the designated application. The installer 203 determines whether a license file has been designated using the user interface screen (step S601). If it is determined that a license file has been designated, control proceeds to step S602. If it is determined that a license file has not been designated, then control proceeds to step S606. If a license file has been designated, this means that a new application will be installed in association with the license file on the user interface screen of FIG. 3, by way of example.

If a license file has been designated, the installer 203 instructs the license management unit 201 to store the designated license file (step S602). After the installer 203 instructs the license management unit 201 to store the license file in a storage unit such as the hard-disk drive 104, the installer decrypts the encrypted portion of the designated application file using the decryption key information contained in the license file (step S603). After it decrypts the application file at step S603, the installer 203 instructs the application management unit 200 to install the decrypted application file (step S604). After the installer 203 instructs the application management unit 200 to install the application file, the installer reads out the application ID that has been defined in the manifest file contained in the application file. Further, the installer 203 reads out the license ID that has been defined in the license file. The installer 203 registers the pair of read-out IDs, namely the application ID and the license ID, in the application list (step S605). When the operation for registration in the application list is completed, installation processing is terminated.

Thus, in a case where an application file is installed upon designating a license file, the application file ID and the license file ID are associated with each other and saved in the application list of FIG. 5 in the manner described at steps S601 to S605.

With reference again to step S601, if it is determined at this step that a license file has not been designated ("NO" at step S601), then control proceeds to step S606. Here it is determined whether a Fragment-Host header has been described in the manifest file contained in the application file (S606). If it is determined that a Fragment-Host header has been described in the manifest file, then control proceeds to step S607. If a Fragment-Host header has not been described in the manifest file, then control proceeds to step S610.

At step S607, the installer 203 detects the application ID of the host bundle, which is a defined value, and determines whether the application ID of the host bundle that has been read out has been registered in the application list. Control proceeds to step S608 if the application ID has been registered or to step S611 if the application ID has not been registered. If it is determined that the application ID has been registered, then the installer 203 specifies the license ID corresponding to the ID of the application file of interest and acquires this ID from a storage unit such as the hard-disk drive 104 (step S608). Thereafter, the installer 203 instructs the license management unit 201 to acquire the license file indicated by the license ID and reads the license file out of the storage unit such as the hard-disk drive 104 (step S609). Since the host bundle and fragment bundle have been encrypted using the same key information, decryption can be performed using the decryption key information contained in the same license file.

Following the processing of step S609, the processing of steps S603 to 5605 is executed. If it is determined at step S607 that the application ID of the host bundle read out has not been registered in the application list, then this means that the application file of the host bundle has not been installed. Accordingly, the installer 203 causes the console 113 to display an alert screen indicating that installation is not possible.

With reference again to step S606, if it is determined at this step that a Fragment-Host header has not been described in the manifest file, this means that the application file is the application file of the host bundle but that a license file has not been designated. Accordingly, since a license file is lacking, the installer 203 restricts the installation of this host bundle and causes the console 113 to display an alert screen indicating that installation is not possible (step S610). Further, in a case where it is determined at step S606 that a Fragment-Host header has been described but a license file corresponding to this fragment bundle has not been stored in the hard-disk drive 104, then the CPU 101 may advance processing to step S608. Such a situation occurs in a case where a license file has been deleted from the storage unit such as the hard-disk drive 104, or in a case where the license file has not been installed, by way of example. In this case also the installer 203 restricts installation of the fragment bundle.

Thus, as described at steps S606 to S609, in a case where an application file designated using the user interface screen of FIG. 3 is a fragment bundle, a license file corresponding to the application file of the host bundle is acquired and installed. In this embodiment, as described above, it is unnecessary to install a license file anew when a fragment bundle is installed. In other words, in a case where a license file corresponding to the application file of a host bundle has already been installed, decryption is performed using this license file. As a result, the time required conventionally to newly install a license file from a server or the like is curtailed and extra storage area for the license file is reduced. This makes it possible to improve the efficiency of an application file installation operation.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-160260, filed Jul. 6, 2009, which is hereby incorporated by reference herein in its entirety.

What is claimed is:

1. An information processing apparatus comprising:
an installing unit configured to install a first type of application program using a license file; and
a first storage control unit configured to store, in a first storage unit, the license file, which is used to install the first type of application program;
a second storage control unit configured to store, in a second storage unit, application identification information identifying the first type of application program and license identification information identifying the license file used to install the first type of application program, wherein the license identification information is associated with the application identification information,
wherein said installing unit detects the application identification information attached to a second type of application program, acquires the license identification information corresponding to the detected application identification information from the second storage unit, acquires the license file identified by the acquired license identification information from the first storage unit, and installs the second type of application program using the acquired license file.

2. The apparatus according to claim 1, wherein the license file includes decryption key information, and said installing unit decrypts each of the first type of application program and the second type of application program using the decryption key information, and installs each of the decrypted first type of application program and the decrypted second type of application program.

3. The apparatus according to claim 1, wherein said second storage control unit stores, in the second storage unit, application identification information which is attached to identifying the second type of application program and the acquired license identification information.

4. The apparatus according to claim 1, wherein, in a case where the first type of application program is installed by said installing unit, the first storage control unit stores the license file used to install the first type of application program in the first storage unit.

5. The apparatus according to claim 1, further comprising:
a scanner configured to read image data; and
a printer configured to print the image data.

6. The apparatus according to claim 1, wherein the second type of application program extends functionality of the first type of application program.

7. The apparatus according to claim 1, further comprising:
a display unit configured to, in a case where the detected application identification information is not stored in the second storage unit, display an alert screen indicting that installation of an application program is not possible.

8. The apparatus according to claim 1, wherein the first storage unit and second storage unit are the same storage unit.

9. An information processing apparatus comprising:
an acceptance unit configured to accept information that designates an application program to be installed and information that designates a license file to be used to install the application program;
an installing unit configured to, when the application program designated by the information accepted by said acceptance unit is a first type of application program, install the designated application program using the designated license file;
a storage control unit configured to store, in a storage unit, the designated license file which is used to install the designated application program, wherein, when the application program designated by the information accepted by said acceptance unit is a second type of application program which extends functionality of the first type of application program, said installing unit installs the designated application program using the license file used to install the first type of application program corresponding to the designated application program and stored in the storage unit, even if the information designating the license file is not accepted by said acceptance unit, and wherein when the application program designated by the information accepted by said acceptance unit is the first type of application program, the designated application program is not permitted to be installed if the information designating the license file is not accepted by said acceptance unit.

10. The apparatus according to claim 9, wherein when the application program designated by the information accepted by said acceptance unit is the second type of application program and the license file used to install the first type of application program corresponding to the designated application program has not been stored in the storage unit, then installing the designated application program without the information designating the license file being accepted by said acceptance unit is restricted.

11. The apparatus according to claim 9, wherein said installing unit identifies the first type of application program corresponding to the second type of application program and installs the second type of application program using the license file used to install the identified first type of application program.

12. The apparatus according to claim 9, wherein
application identification information identifying the first type of application program corresponding to the second type of application program is attached to the second type of application program, and
said installing unit detects the application identification information attached to the second type of application program, and installs the second type of application program using the license file used to install the first type of application program identified by the detected application identification information.

13. The apparatus according to claim 9, wherein said installing unit identifies the license file to be used to install the first type of application program corresponding to the second type of application program and acquires the identified license file from the storage unit.

14. The apparatus according to claim 9, further comprising:
a display unit configured to, in a case where the first type of application program corresponding to the second type of application program is has not been installed, display an alert screen indicating that installation of the second type of application program is not possible.

15. The apparatus according to claim 9, wherein
the license file includes decryption key information,
said installing unit decrypts each of the first type of application program and the second type of application program using the decryption key information, and installs each of the decrypted first type of application program and the decrypted second type of application program.

16. The apparatus according to claim 9, further comprising:
a display unit configured to, in a case where the application program designated by the information accepted by said acceptance unit is the first type of application program and the information designating the license file is not accepted by said acceptance unit, display an alert screen indicting that installation of an application program is not possible.

17. The apparatus according to claim 9, further comprising:
a scanner configured to read image data; and
a printer configured to print the image data.

18. A method of controlling an information processing apparatus comprising:
installing a first type of application program using a license file; and
storing, in a first storage unit, the license file, which is used to install the first type of application program;
storing, in a second storage unit, application identification information identifying the first type of application program and license identification information identifying the license file used to install the first type of application program, wherein the license identification information is associated with the application identification information;
detecting the application identification information attached to a second type of application program;
acquiring the license identification information corresponding to the detected application identification information from the second storage unit;
acquiring the license file identified by the acquired license identification information from the first storage unit; and
installing the second type of application program using the acquired license file.

19. A non-transitory computer-readable storage medium storing a program for causing a computer to execute a method, said method comprising:
installing a first type of application program using a license file;
a storage control step of storing, in a first storage unit, the license file, which is used to install a main the first type of application program;
storing, in a second storage unit, application identification information identifying the first type of application program and license identification information identifying the license file used to install the first type of application program, wherein the license identification information is associated with the application identification information;
detecting the application identification information attached to a second type of application program;
acquiring the license identification information corresponding to the detected application identification information from the second storage unit;
acquiring the license file identified by the acquired license identification information from the first storage unit; and
installing the second type of application program using the acquired license file.

* * * * *